United States Patent [19]

Biber

[11] 3,846,812
[45] Nov. 5, 1974

[54] AUTOMATIC ELECTRONIC FLASH CAMERA
[75] Inventor: Conrad H. Biber, Needham, Mass.
[73] Assignee: Polaroid Corporation, Cambridge, Mass.
[22] Filed: Dec. 20, 1973
[21] Appl. No.: 426,966

[52] U.S. Cl.............. 354/145, 354/173, 354/212
[51] Int. Cl.... G03b 15/05, G03b 17/52, G03b 1/12
[58] Field of Search ............ 354/145, 126, 173, 212

[56] References Cited
UNITED STATES PATENTS
3,285,150  11/1966  Wunderle ................. 354/145 X
3,296,949  1/1967   Bounds ..................... 354/173
3,752,047  8/1973   Gordon et al. ............. 354/145 X
2,996,966  8/1961   Edgerton .................. 354/173

Primary Examiner—Robert P. Greiner
Attorney, Agent, or Firm—John W. Ericson

[57] ABSTRACT

An automatic camera having an electronic flash system and a film transport motor for ejecting and processing film units of the self-processing type. The apparatus includes sequencing circuits responsive to the operation of a shutter button to make a flash exposure, then operate the film transport motor to eject a film unit, and finally to initiate recharging of the electronic flash system.

13 Claims, 10 Drawing Figures

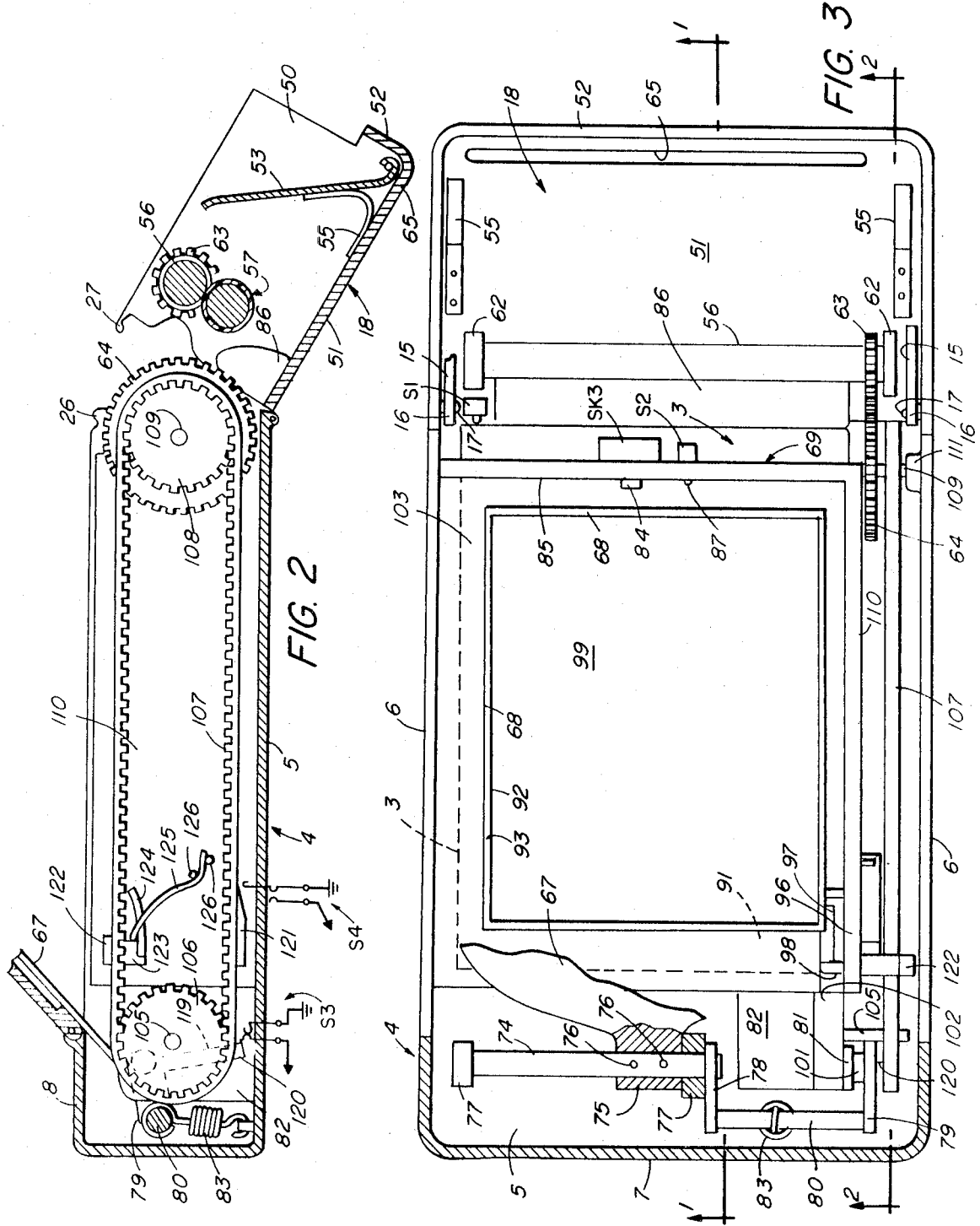

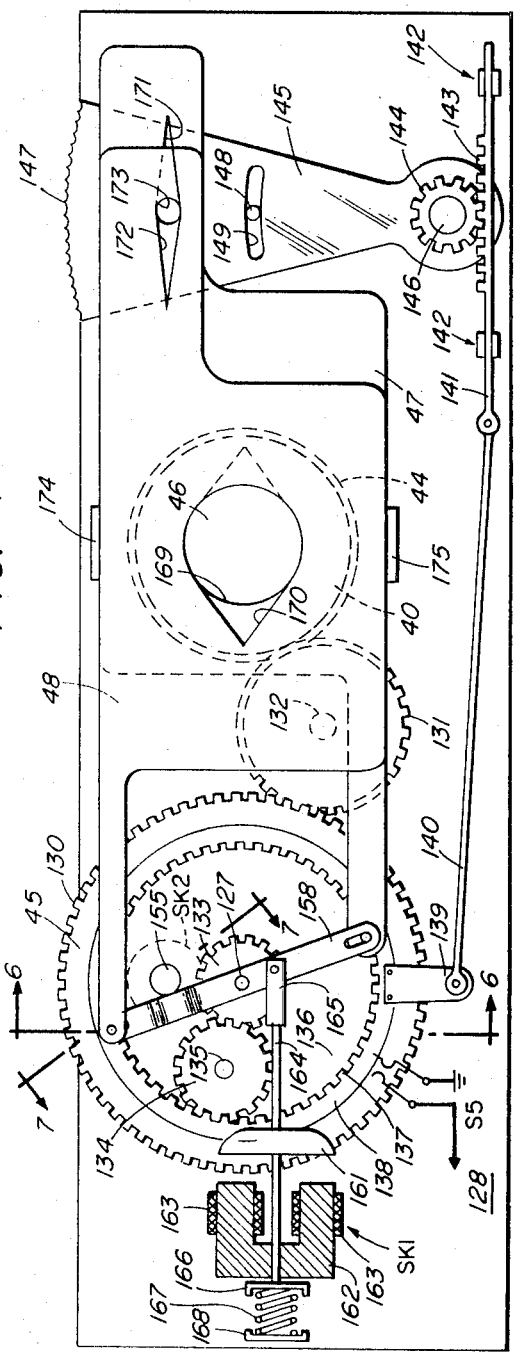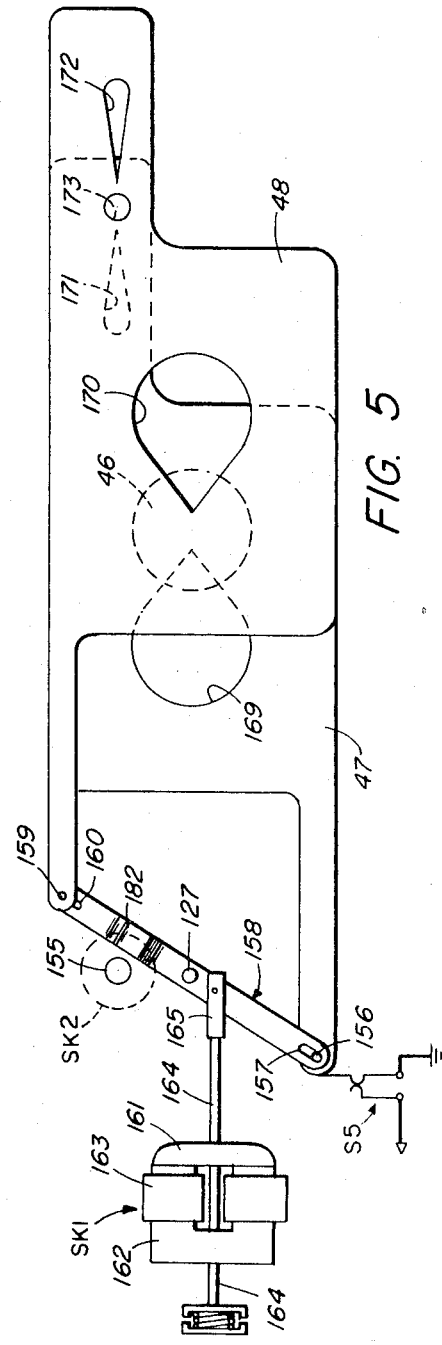

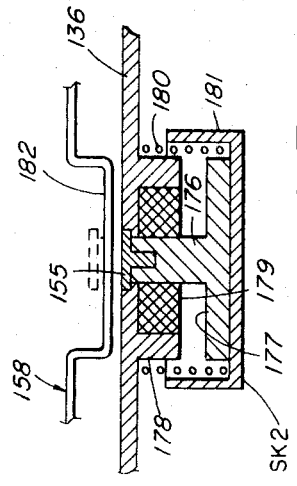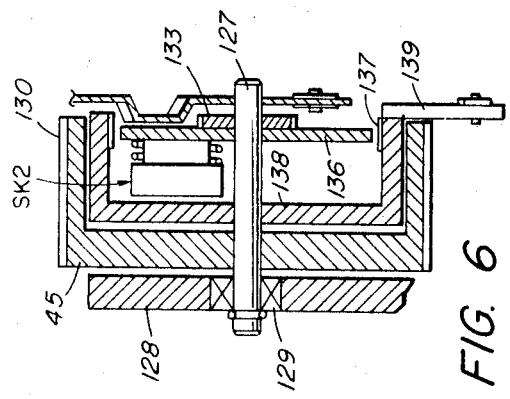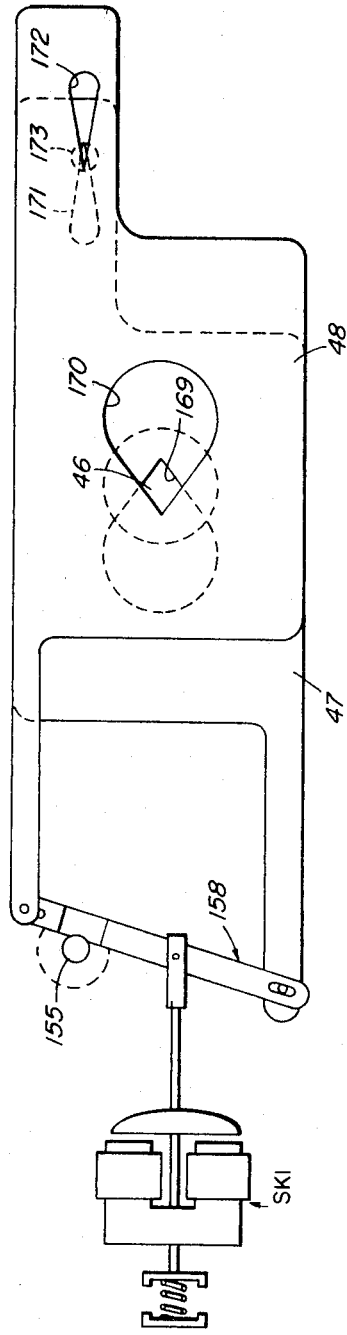

AUTOMATIC ELECTRONIC FLASH CAMERA

This invention relates to photography, and particularly to a novel automatic electronic flash camera.

Progress in photography has been marked by a succession of inventions and discoveries intending to make it simpler and more convenient to produce a finished photograph. Initially, these goals were approached by limiting the capabilities of the camera; for example, a simple box camera makes it possible for almost anyone to take a reasonably good picture on a bright day by eliminating focusing adjustments, and by using a single shutter speed and a fixed aperture.

Today, the emphasis is on retaining as much as possible the flexibility of the technical camera, while at the same time preserving the operational simplicity of the box camera. Toward that end, cameras have been progressively made more nearly automatic in the execution of the various functions required to make a photograph.

As a particular example of the state of the art illustrating this trend, the Polaroid SX-70 Land Camera provides an extensive photographic capability coupled with great operational simplicity. With the exception of a trim control, which is occasionally needed to correct for extreme conditions, the operator's controls are limited to a focus knob and a shutter pushbutton.

When the camera has been focused and the pushbutton depressed, the camera automatically determines the correct aperture and exposure time in response to the ambient light present, makes an exposure, and ejects an exposed film unit through a pair of processing rolls so that the exposed film unit is ejected within seconds and develops as a finished print within minutes. The camera contains a motor for driving the exposed film unit out through the processing rolls, and performing various other functions in the operating cycle. Compactness and reliability are obtained by powering this motor with a thin, flat battery contained in and supplied with each film pack for use with the camera. Since the battery is regularly renewed with the film, a smaller battery can be employed than if the battery were required to supply operating current for prolonged periods of use.

Cameras, such as the Polaroid SX-70 Land Camera, which have automatic exposure control, and are thus capable of dealing with a very wide range of ambient light conditions, are also expected today to be capable of dealing with situations in which there is very little or no ambient light. Accordingly, they are usually complemented by the provision for the use of flash lamps or electronic flash units.

Adaptation to use of flashlamps is relatively simple, because no great power is required to ignite a flashlamp. On the other hand, electronic flash units are conventionally provided with their own power supplies. Such power supplies are usually in the form of rechargeable batteries together with means for using alternating current, either to trigger the flash tube, to recharge the batteries, or both. The reason is the high charging currents needed to recharge the storage capacitor in the electronic flash unit between discharges.

It would be highly desirable to be able to employ an electronic flash unit without requiring a separate battery, and in fact, to use the same battery provided to operate the film transport motor and the electronic circuits involved in determining and making the exposure in an automatic camera. The object of this invention is to make it easier to do so by reducing the combined current drain requirements on a battery that is employed for film transport, automatic electronic exposure determination, and electronic flash unit charging.

Briefly, the above and other objects of this invention are attained by a novel camera control system including an electronic flash unit with a novel charge control circuit that greatly reduces the load on the battery. Broadly, the electronic flash unit is constructed so that it does not begin to recharge as soon as it is triggered, as do conventional electronic flash units. More particularly, the circuit is arranged to first trigger the flash unit to make an exposure, then operate the film transport motor, together with intermediate functions to be described, and to commence recharging the electronic flash unit only after the film transport motor has ceased to run. As an example of the effectiveness of this technique in reducing the demands on the battery, a film transport motor such as used in the Polaroid SX-70 Land Camera may typically require one to one and one-half amperes for a second to a second and one-half for each operating cycle. Suitable electronic flash units may require an initial current of from one to one and one-half amperes, tapering to a hundred milliamperes or so over a period of from ten to twenty seconds, for each charge. If the electronic flash unit begins to charge immediately after it is triggered, as is conventional, the result is a demand on the battery for from two to three amperes for from a second to a second and one-half. If this dual demand is not made, a battery that is half the size of one required to meet the dual demand will suffice to operate both the motor and the flash unit, so far as current drain capability is concerned. And, because of the relatively short time required to run the motor, very little more than sufficient battery capability to operate the flash unit is required to perform both functions.

The apparatus of the invention, and its mode of operation, will best be understood in the light of the following detailed description, together with the accompanying drawings, of an illustrative embodiment thereof.

In the drawings,

FIG. 2 is a fragmentary schematic elevational view, with parts shown in cross-section, parts omitted and parts broken away, of the apparatus of FIG. 1, taken substantially along the lines 2—2 of FIG. 3;

FIG. 3 is a fragmentary schematic plan view of the apparatus of FIGS. 1 and 2, taken substantially along the lines 3—3 in FIG. 1, with parts omitted, parts shown in cross-section and parts broken away;

FIG. 4 is a schematic elevational sketch, with parts shown in cross-section, showing the details of exposure control means forming a portion of the apparatus of FIGS. 1 through 3 on an enlarged scale;

FIG. 5 is a schematic elevational sketch of a portion of the apparatus of FIG. 4, showing the parts in another position assumed during their cycle of operation;

FIG. 6 is a schematic cross-sectional view of a portion of the apparatus of FIG. 4, taken substantially along the lines 6—6 of FIG. 4;

FIG. 7 is a schematic fragmentary cross-sectional elevational sketch of a portion of the apparatus of FIGS. 4, 5 and 6, taken substantially along the lines 7—7 in FIG. 4 but on an enlarged scale;

FIG. 8 is a schematic fragmentary elevational sketch similar to FIG. 5, showing the parts of FIG. 5 in another position assumed during their operation;

Figure 1:
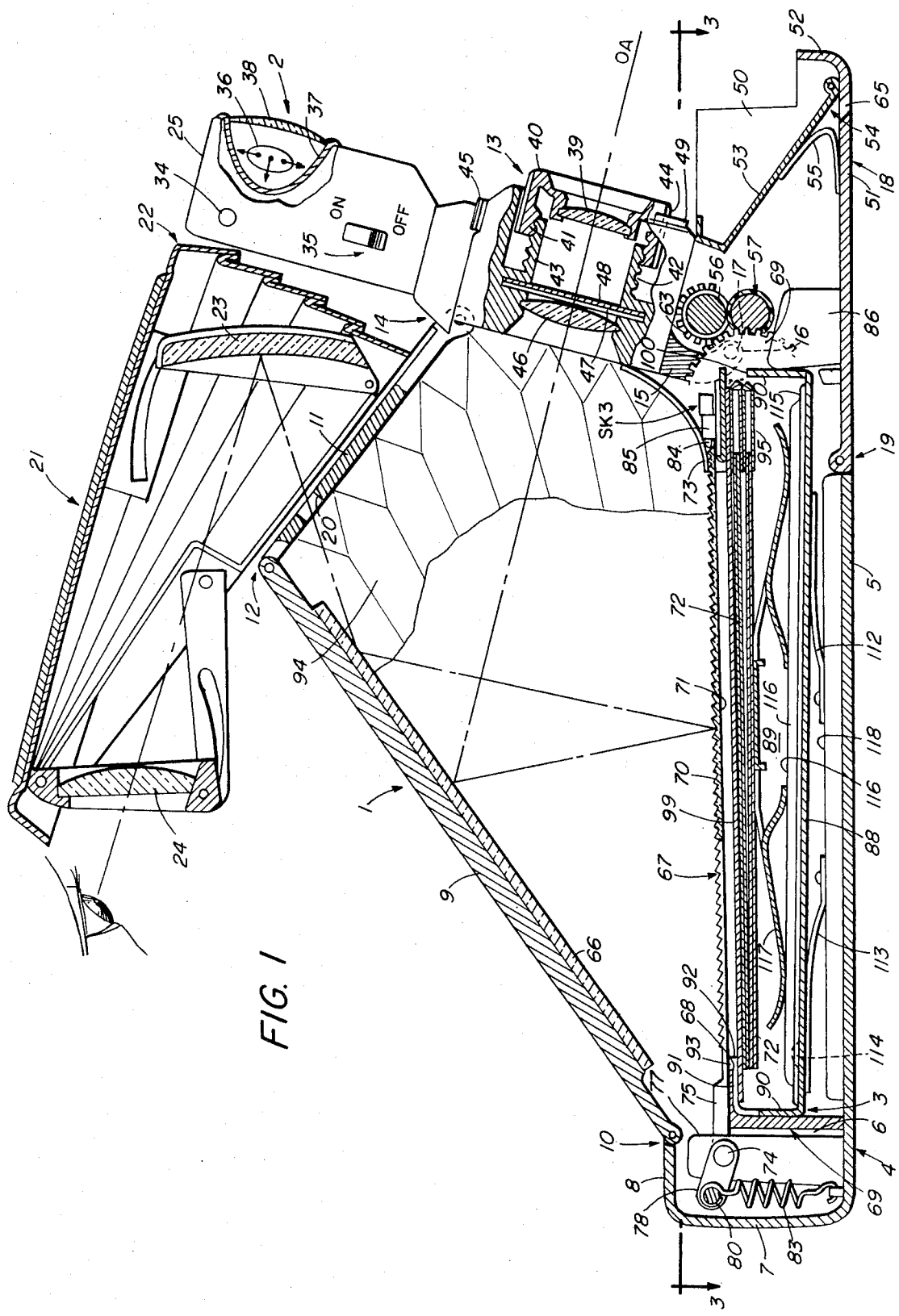
FIG. 1 is a schematic elevational sketch, with parts shown in cross-section and parts broken away, of an automatic camera equipped with an electronic flash system in accordance with the invention, taken essentially along the lines 1—1 in FIG. 3 but with additional parts shown.

Referring first to FIG. 1, there is shown an automatic camera generally designated 1 provided with a strobe unit generally designated 2. The strobe unit at times provides light for the exposure of film units in a cassette generally designated 3, received in the housing of the camera in a manner to be described. The strobe unit 2 may be formed as an integral part of the camera. Alternatively, the strobe unit may be made as a detachable accessory, if so desired. The camera is shown in the erect position with a cassette 3 in the condition assumed just after it has been inserted in the camera.

In more detail, the camera 1 comprises a body housing 4 comprising a bottom wall 5, side walls such as 6, and an end wall 7. The top wall 8 of the body housing 4 is hinged to a rear cover panel 9 as suggested at 10. The cover panel 9 is hinged to a forward cover panel 11 as suggested at 12.

The panel 11 is hinged to a lens board and shutter housing generally designated 13, as indicated at 14. The lens board and shutter housing 13 is provided with support arms 15 extending down on either side to ears 16 connected to extensions of the sidewalls 6 by means shown as pivot pins 17. By this arrangement, the panels 9 and 11 and the lens board and shutter housing 13 can be pivoted between the erected position, shown in FIG. 1, and a collapsed position in which the panels 9 and 11 are substantially parallel to and coplanar with the top panel 8.

In the collapsed position, the lens board and shutter housing 13 comes down into a front housing portion 18. The strobe unit 2 then projects outwardly from the front housing 18. The front housing 18 is hinged to the body housing 4 as indicated at 19, for movement between the position shown in FIG. 1 and the position shown in FIG. 2, in which a cassette 3 can be inserted into the housing.

The front housing 18 may be held in the position shown in FIG. 1 by conventional detachable latch means, schematically shown in FIG. 2 as cooperating parts 26 and 27 on the housings 4 and 18, respectively. Similarly, the panels 9 and 11 may be held in the erected position shown by a detachable conventional erecting linkage, not shown, extending between the housing 4 and one of the panels.

The forward upper panel 11 is provided with an aperture indicated at 20 which serves to admit light to a viewfinder assembly generally designated 21. The details of the viewfinder assembly 21 form no part of this invention, but, as schematically indicated, comprise a collapsible housing 22 secured to the top panel 11 and containing a concave viewing mirror 23 for directing image-forming rays from the aperture 20 through an objective lens 24 mounted in the housing 22. The housing 22 may be made collapsible, if desired, as shown and described in more detail, for example, in copending U.S. application for Letters Patent, Ser. No. 308,679, filed on November 22, 1972 by Edwin H. Land for ELECTRONIC PHOTOGRAPHIC SYSTEM and assigned to the assignee of this application.

The strobe unit 2 comprises a housing 25 of any suitable conventional material, such as plastic or the like, which is formed integral with the upper portion of the lens board and shutter housing 13. In the housing 25 is formed a window through which a ready light 34, to be described below, is visible. Also mounted on the housing 25 is an ON-OFF switch 35. A strobe tube 36, which may be a grid-controlled gas discharge tube of the conventional variety, is mounted in a reflector 37 secured to the housing 25. A lens 38 over the reflector 37 protects the gas tube 36 from external damage, and cooperates with the reflector to direct light into the solid angle seen by the camera lens.

A taking lens mounted in the lens board and shutter housing 13 comprises an outer movable front element 39 mounted in an adjustable barrel 40. The barrel 40 is threaded, as indicated at 41, to cooperate with corresponding threads 42 formed on a fixed barrel portion 43 of the lens board and shutter housing 13 for rotation about the optical axis of the lens to move the front element back and forth, and thereby focus the lens on objects at various distances from the camera.

The adjustable barrel portion 40 is formed with teeth 44 around its outer periphery to cooperate with a gear, not shown in FIG. 1, that connects it to a rotatable manual knob 45, to be described in connection with FIG. 4, to enable the operator to rotate the front element 39 and thereby translate it along the optical axis of the camera and focus the lens.

A rear lens element schematically indicated at 46 is secured in the barrel portion 43. Between the elements 39 and 46 is located a shutter comprising a pair of relatively movable blades schematically indicated at 47 and 48, to be described below in more detail with reference to FIGS. 4, 5, 6, 7 and 8.

A manually operable shutter button 49 is schematically shown as located on the front of the lens board and shutter housing 13, for convenient access by the finger of an operator. The three elements on the camera which require manipulation by the operator are thus the ON-OFF switch 35, which controls charging of the strobe unit 2, the focus knob 45, and the shutter button 49. Other functions required for the exposure and processing of a photograph are carried out automatically, in a manner to appear.

The front housing 18 comprises side walls such as 50, a bottom wall 51 hinged to the main housing floor at 19, and a partial front wall 52. A plate 53, of sheet metal or the like, is hinged to the bottom wall 51 as indicated at 54 and biased upwardly to the position shown in FIG. 1 by springs 55. See also FIG. 3.

In the position shown in FIG. 1, the plate 53, lens board and shutter housing 13, and side walls 50 and bottom wall 51 of the housing 18 define a lighttight space about a pair of spreader rolls 56 and 57. The spreader rolls 56 and 57 are journalled in bearings 62 fixed to the bottom plate 51, as suggested in FIG. 3.

The rolls 56 and 57 are in frictional engagement so that when one of the rolls is driven, the other follows. For that purpose, a gear 63 fixed to the spreader roll 56, as shown in FIGS. 1 and 3, is arranged to be driven by a gear 64, in a manner to be described below, and thereby drives the roll 57.

The roll 56 may be made of stainless steel and the roll 57 may be made of stainless steel covered with polyurethane. A film unit, introduced into the bite of the rolls in a manner to appear, will be driven by the rolls toward an exit slot 65 formed in the bottom wall 51.

The optical system of the camera 1 is completed by a fixed mirror 66, mounted on the lower surface of the upper panel 9, and a movable mirror 67. The mirror 67 is movable between the position shown in FIG. 1, and a rotated position in which it is closely adjacent and parallel to the mirror 66. In the position shown in FIG. 1, the mirror 47 covers a framing aperture 68 formed as a rectangular opening in the top wall 103 of a cassette receiving well generally designated 69 formed integrally with the bottom wall 5 of the rear housing 4 and serving to enclose the cassette 3 and other apparatus to be described.

In the position of the mirror 67 shown in FIG. 1, a fresnel mirror surface 70 formed on the upper side of the mirror 67 forms a part of a viewing and focusing system. In that position, light entering along the optical axis OA of the lens is reflected downwardly from the mirror 66, then reflected upwardly from the fresnel mirror surface 70, is again reflected from the mirror 66 to the concave mirror 23, and thence passes through the objective lens 24 to the observer. The observer then rotates the front barrel 40 of the lens to bring the observed image into focus.

When the mirror 67 is moved into its position parallel to the mirror 66, light entering through the lens is reflected from a mirror surface 71 formed on the lower surface of the mirror 67 down onto the uppermost one of a set of film units such as 72 in the cassette 3. In that position, a flexible flap 73 hinged to the end of the mirror 67 covers the aperture 20 in the front of the panel 11 and prevents light from entering through the viewing system and exposing the film unit.

The mirror 67 is mounted on a shaft 74, as best shown in FIG. 3, by means schematically indicated as comprising an extension 74 formed on the end of the mirror 67 and bored to accept the shaft 74, the shaft 74 being affixed to the mirror 67 by pins indicated at 76. The shaft 74 is journalled for rotation in the rear housing 4 in bearings schematically indicated at 77 secured to the bottom plate 5.

The shaft 74 is fixed to a crank arm 78. The crank arm 78 is connected to another crank arm 79 by an intermediate crank pin 80. The crank arm 79 is fixed to a stub shaft 101 that is journalled for rotation in bearings schematically indicated at 81 fastened to the outer housing of a reduction gearing assembly schematically indicated at 102 and driven by a DC motor 82 at times to be described below.

The crank pin 80 is connected to one end of a tension spring 83 that is secured at its other end to the bottom panel 5, as schematically indicated in FIGS. 1 and 2. The spring 83 urges the mirror 67 upwardly, against a stop, not shown, such that it is close to and parallel with the mirror 66.

When the crank assembly 78, 79 and 80 is driven in a manner to be described, the mirror 67 is brought down to the position shown in FIG. 1, where it is detachably retained by a latch schematically indicated at 84. The latch 84 protrudes through a wall 85 formed integrally with the main housing 4, and is spring biased into the latching position shown. The latch 84 is arranged to be released when a solenoid SK3 is energized in a manner to be described.

A support member 86 fixed to the bottom wall 51 of the front housing 18 is adapted to engage and retain a cassette 3 in position on the housing 4 when the front housing 18 is in the position shown in FIG. 1. When the cassette 3 is present in the housing 4, and the housing 18 is closed, a switch S1, schematically indicated in FIG. 3, is closed. At other times, the switch S1 is open, and indicates that the housing is open, or that no cassette is in place.

When the mirror 67 is moved into the position shown in FIG. 1, a second switch S2 is closed. As indicated in FIG. 3, the switch S2 has an actuating element 87 protruding through the wall 85 and adapted to be engaged by the mirror 67 when it is in the position shown in FIG. 1. In the position of the mirror 67 shown in FIG. 2, the switch S2 is open.

The cassette 3 may be an SX-70 Land film pack, as manufactured and sold for use in the Poleroid SX-70 Land Camera. The cassettes 3 are generally trapezoidal in crosssection, as shown in FIG. 1, and generally rectangular in plan, as suggested in FIG. 3. The cassettes each comprise a housing, of plastic or the like, comprising a bottom wall 88, side walls such as 89, end walls such as 90, and a top wall 91. The top wall 91 is formed with a rectangular recess 92 surrounded by a rim 93 that mates with the framing aperture 68 in the camera and serves to define the limiting aperture through which the uppermost film unit 72 is exposed.

A lighttight seal is formed about the chamber defined by the panels 9 and 11, the lens board and shutter housing 13, and the housing 4, by flexible bellows panels schematically indicated at 94. The panels 94 are connected to the sides of the elements with which they define the lighttight film exposing space.

The film units 72 in the cassette 3 may be of the type shown and described in U.S. Pat. No. 3,415,644, issued on Dec. 10, 1968 to Edwin H. Land for NOVEL PHOTOGRAPHIC PRODUCTS AND PROCESSES, and in U.S. application for Letters Patent Ser. No. 194,407, filed on Nov. 1, 1971 by Edwin H. Land for NOVEL PRODUCTS AND PROCESSES and both assigned to the assignee of this application. Generally, as is more fully disclosed in those references, the film units comprise a number of photosensitive layers in which latent color images can be formed, and other layers which cooperate with the photosensitive layers. A processing composition is contained in a pod 95 at the end of each said film unit. When the film unit is compressed between the spreader rolls 56 and 57, the processing composition in the pod 95 is forced between selected layers of the film unit, thereby initiating the diffusion transfer process which develops and fixes the image.

Referring to FIG. 3, a slot 96 formed in one corner of the top wall 103 of the cassette receiving compartment 69 exposes a slot 97 formed in the top wall 91 of the cassette 3 and is adapted to receive a picker finger 98. The picker finger 98 is actuated at times to be described to move the topmost one of the film units 72, or a dark slide 99 that initially covers the film units as shown in FIGS. 1 and 3, out through a slot 100 in the end wall 90 of the cassette and into the bite of the rolls 56 and 57. As will appear, the function of ejecting the dark slide 99 is performed automatically when the cassette is first inserted in the camera and the housing 18 is closed.

A DC motor 82 is mounted on the base plate 5 in the housing 4, and is connected to drive the shaft 105 through the reduction gear assembly 102. The motor 82 may be assumed to be a conventional DC motor coupled to a conventional planetary reduction gear train 102. As shown in FIG. 2, the gear train 102 has an output shaft 105 fixed to a gear 106 having teeth meshing with corresponding teeth formed on a flexible timing belt 107 of fiber reinforced rubber, polyurethane, or other synthetic resin, or other suitable flexible but relatively inextensible material.

The timing belt 107 is coupled to a gear 108 fixed on a shaft 109 disposed at the front of the housing 4 and confronting the housing 18. The shaft 109 is journalled in suitable bearings fixed to the well 110 of the cassette well 69 and to a bearing 111 secured to the wall 6, as indicated in FIG. 3.

On the shaft 109 is a fixed gear 64 which drives the processing rolls 56 and 57 through the gear 63, as described above, when the front housing 18 is in the position shown in FIG. 1.

The cassette 3 is retained in the position shown, and urged upwardly into engagement with the framing aperture 68 in the camera, by a pair of springs, such as the spring 112 shown in FIG. 1, toward one end of the cassette 3, and a resilient pair of spring contact fingers such as 113. The contact fingers 113 are electrically connected to circuit means, to be described, to supply power to the camera and strobe unit when the cassette is in position.

The fingers 113 are formed with contacts such as 114 that extend up through cooperating apertures in the bottom wall 88 of the cassette 3, and thence through corresponding apertures formed in an insulating backing plate 115, of cardboard or the like, into engagement with the terminals of a battery, generally designated 116 and described in more detail in the above-cited copending U.S. application Ser. No. 308,679.

The battery 116 is retained in position against the bottom wall 88 of the cassette 3 by means of a spring schematically shown at 117 that also serves to urge the film units 72 upwardly toward the framing aperture in the camera. Most of the components of the camera control circuits, to be described below, may be made in compact integrated circuit form and disposed in a suitable compartment on the floor of the housing 8, as schematically indicated at 118.

As best shown in FIGS. 2 and 3, the crank arm 79 is formed integrally with an angularly disposed crank arm 119 that extends outwardly to an extension 120. The extension 120 passes beneath the belt 107, in position for engagement with a cam 121 formed integrally with the belt, and also into a position into which it can close the contacts of a switch S3 in the position shown in FIG. 2, for purposes to be described.

When the shaft 105 is turned by the drive shaft 105 in the sense driving the belt 107 clockwise in FIG. 2, the cam 121 engages the extension 120 formed on the crank arm 119, causing the switch S3 to open and driving the crank arms 79 and 78 through the intermediate crank pin 80 to turn the shaft 74 and bring the mirror 67 from the position shown in FIG. 2 down into the latched position shown in FIG. 1. As the cam 121 drives the arm 119 clockwise, as seen in FIG. 2, the extension 120 rises radially away from the cam 121 because of the different centers of rotation of the shaft 105 and of the arm 119 about the shaft 101. The cam 121 may be arranged to leave the extension 120 just after the mirror 67 has been brought down into position to be captured by the latch 84 in FIG. 1.

Freed of the load of the arm 119 working against the spring 83, the cam 121 travels into engagement with a slider arm 122. The arm 122 is formed integrally with a downwardly extending arm 123 which is bent to extend through a slot 124 formed in the wall 110, and is bent again to form the picker finger 98 described above. The assembly comprising the arms 122 and 123 and the integral picker finger 98 are urged into the position shown in FIG. 2 by a light spring 125 affixed to one end of the wall 110 by means shown as pins 126.

As the arm 122 is driven to the right in FIG. 2 by the cam 121, it rides up in the slot 124 until it rides over the cam 121. The arm 122 is then returned to the position shown in FIG. 2 by the spring 125. In the meantime, the picker arm 98 has engaged one of the film units, or the dark slide 99, in the cassette 3, and advanced it into engagement with the processing rolls 56 and 57. The rolls are simultaneously driven, through the belt 107 and the gears 108, 64 and 63.

As the belt 107 continues to be driven, the dark slide or film unit will be ejected through the rolls 56 and 57, and thence out through the exit slot 65. Assuming that the ejected element is a film unit 72, the processing fluid within the pod 95 will be disturbed through it as it passes through the processing rolls, causing a finished print to be produced shortly after the unit is ejected from the camera.

As the cam 121 approaches the position shown in FIG. 2, it momentarily closes the switch S4. As will appear, closure of the switch S4 will interrupt power to the motor, causing it to coast to a stop with the cam 121 approximately in the position shown in FIG. 2. The exact final position of the cam 121 is not critical.

The details of the exposure control system housed in the lens board and shutter housing 13 will next be described, with reference to FIGS. 4 through 8.

FIGS. 4 and 6 show the focus control elements of the camera of FIG. 1. Specifically, a manually controlled focusing knob 45 is mounted on a shaft 127. As best shown in FIG. 6, the shaft 127 is journalled for rotation in a support plate 128 by means schematically shown as bearings 129. The support plate 128 may be fixed in the lens board and shutter housing 13.

The knob 45 is fixed on the shaft 127 and is provided at its periphery with teeth 130 which serve both to provide a grip for the operator's finger and to mesh with a pinion 131, as shown in FIG. 4, which is rotatably mounted on the plate 128 by means of a shaft 132. The gear 131 meshes with the teeth 44 formed on the barrel 40 of the lens as described above in connection with FIG. 1.

By the construction just described, the lens of the camera is focused when the knob 45 is rotated manually. Provision is also made for establishing the aperture to which the lens will open as a function of the focused distance, for use when electronic flash is employed. For that purpose, referring to FIGS. 4 and 6, a gear 133 is fixed on the shaft 127 to rotate with the knob 45.

The gear 133 drives a planetary gear 134. The gear 134 is rotatably mounted on a shaft 135 that is fixed to a disc 136 on which a solenoid generally designated SK2, to be described below, is mounted. The disc 136 is preferably made of a ferromagnetic material.

The planetary gear 134 also meshes with teeth 137 formed on the inner periphery of a cup-shaped member 138 which is rotatably mounted on the shaft 137. An arm 139 affixed to the angular gear 138 is coupled by a link 140 to a rack 141. The rack 141 is slidably mounted in guides 142 that are affixed to the plate 128.

Teeth 143 on the rack 141 mesh with a pinion 144. The pinion 144 is fixed to an adjustable trimming element 145, of transport material such as plastic or the like, and rotatably mounted on a shaft 146 that is fixed to the plate 128. The trim piece 145 is of generally triangular shape, and is provided with serrations 147 at its upper periphery to facilitate rotation about the axis of the shaft 146 by an operator whose finger engages the serrations 147. Rotation of the trim piece 145 about the shaft 146 is limited by a pin 148 affixed to the plate 128 and extending through an arcuate slot 149 formed in the trim piece 145.

It will be apparent that when the trim piece 145 is rotated clockwise or counterclockwise as seen in FIG. 4, a corresponding rotation of the annular gear 138 will be produced. That will cause rotation of the planetary gear 134, with concomitant movement of the shaft 135, carrying the disc 136 about the shaft 127, because the gear 133 is relatively fixed. On the other hand, when the trim piece 145 is stationary, rotation of the focusing knob 45 with concomitant rotation of the gear 133 will also cause rotation of the gear 134, rotating the shaft 135 about the axis of the shaft 127.

The rotated position of the disc 136, established by the relative positions of the shafts 127 and the link 139, determines the position of an interceptor 155, controlled by the solenoid SK2 in a manner to appear, to determine the maximum aperture to which the shutter is opened in a manner next to be described.

As shown in FIGS. 4, 5 and 8, the shutter comprises a pair of blades 47 and 48. The shutter blade 47 is provided at one end with a pin 156 that is received in an elongated slot 157 formed in one end of a walking beam 158. Similarly, the blade 48 is provided at one end with a pin 159 that is received in a beam 160 formed at the other end of the walking beam 158.

The beam 158 is rotatably mounted on the shaft 127, for free rotation about the axis of the shaft 127 except as constrained by a solenoid SK1, and associated apparatus, next to be described. The solenoid SK1 has an armature 161 adapted to be attracted to a core 162 when windings such as 163 on the core 162 are suitably excited in a manner to be described.

An actuator shaft 164 connected to the armature 161 is formed with a clevis 165 at one end that is rotatably pinned to the walking beam 158. The shaft 164 extends through the armature 161, to which it is affixed, and thence through a suitable bore formed in the core 162 to a stop plate 166 formed integrally with the arm 164.

The arm 164 is urged to the position shown in FIG. 4 by means of a spring 167 extending between the plate 166 and a fixed support plate 168 secured to the plate 128. By this arrangement, the shutter blades 47 and 48 are driven to the position shown in FIG. 4 by the spring 167 when the solenoid SK1 is deenergized. The blades 47 and 48 are moved to the position shown in FIG. 5 when the solenoid SK1 is energized.

The shutter blades 47 and 48 may be stopped in an intermediate position, as shown in FIG. 8, if the interceptor pin 155 is in the path of the walking beam 158 as it moves from the position shown in FIG. 5 to the position shown in FIG. 4. One such typical interrupted position is shown in FIG. 8.

In the position of the shutter blades shown in FIG. 4, a tear-shaped aperture 169 in the blade 47, and a corresponding oppositely directed tear-shaped aperture 170 in the blade 48, expose the lens elements such as 46 at full aperture. In this posiiton of the blades 47 and 48, a second generally tear-shaped aperture 171 in the blade 47, and a corresponding oppositely directed tear-shaped aperture 172 in the blade 48, expose an aperture 173 in any suitable mask, not shown, behind which a photocell, to be described, is located.

The aperture 173 is exposed through the overlying portion of the trim member 145, which may be provided with a circumferentially graduated neutral density scale so that as the trim piece 145 is rotated clockwise or counterclockwise as shown in FIG. 4, more or less light is admitted through the aperture 173 at any given position of the blades 47 and 48. The purpose of this control is to enable the photographer to trim the operation of the automatic exposure apparatus, to be described, so that longer or shorter exposure may be selected to take care of particular scene conditions. The same trimming movement causes a corresponding trimming movement of the annular gear 138, to adjust the rotated position of the interceptor pin 155 for purposes to appear.

In the position of the parts shown in FIG. 5, with the solenoid SK1 energized, the lens openings are closed because the apertures 169 and 170 in the shutter blades 47 and 48 are out of registry. The photocell aperture 173 is likewise closed at this time. As the shutter blades 47 and 48 are positioned relative to each other by the walking beam 158, under the control of the solenoid SK1 and the spring 157, they are guided for parallel movement by guide means suggested at 174 and 175, fixed to the plate 128.

Comparing FIGS. 4 and 5, a normally open switch S5 is closed by the end of the blade 47 in the closed position of the shutter shown in FIG. 5. Closure of the switch S5 produces a signal used to control the apparatus in a manner to be described below.

The interceptor pin 155 is controlled by the solenoid SK2 in the manner shown in FIG. 7. In particular, the interceptor pin is formed as a cap screw threaded into engagement with the output shaft 176 of the solenoid SK2. The shaft 176 is of ferromagnetic material, made integral with an armature 177.

The disc 136, of ferromagnetic material, is formed integral with an annular core member 178 which cooperates with the armature 177 when windings 179 are energized to attract the armature 177 to the core piece 178 against the influence of a light spring 180 which extends between the disc 136 and a nonferromagnetic cap 181 secured to the armature 177. When the windings 179 are energized, the interceptor pin 155 is moved upwardly in FIG. 7 to the position shown in dotted lines, where it can intercept a bight 182 formed on the walking beam 158 and prevent further movement of the walking beam.

As shown in FIG. 5, in the closed position of the shutter, the walking beam 158 is displaced from the pin 155, which it will approach by counterclockwise rotation about the shaft 127 when the solenoid SK1 is released. The pin 155 will intercept the walking beam 158 at an adjusted position of the shutter blades that depends on the adjusted position of the disc 136 carrying the interceptor pin 155 and the solenoid SK2. The major adjustment of this position is made with the focusing knob 45, a trim adjustment can be made with the trim piece 145 as described above.

As will appear, in the flash or strobe mode of operation of the camera, the solenoid SK2 is energized when the solenoid SK1 is deenergized, so that the interceptor 155 will move into the path of the walking beam 158 before the spring 167 has a change to move the beam 158 past the pin 155. If the solenoid SK2 is not energized, as for ambient light exposure, the bight 182 in the beam 158 will simply pass over the pin 155 without interference.

The control circuits for the camera and strobe unit of FIGS. 1 through 8 will next be described with reference first to FIG. 9. For simplicity, the motor 82 is shown schematically in FIG. 9 as being directly connected to the output shaft 105 that drives the gear 106. The gear 106 drives the timing belt 107 carrying the cam 121, as described above.

The motor 82 is operated when a conventional electronic switch S7 is closed and a supply potential at B+ is present to cause the flow of operating current through the load terminals *a* and *b* of the switch S7 and through the winding of the motor 82 to ground. The switch S7, and other electronic switches to be described, may be any conventional electronic switches having load terminals *a* and *b* between which a low impedance appears when a current signal, positive with respect to ground, is supplied to a control terminal *c*.

The switch S7 is closed to cause the motor 82 to run when a flip flop F1, of any conventional design, is set to produce a signal labeled RUN that is positive with respect to ground. The conventional followed here, as elsewhere in the drawings to be described except where noted, is that the label indicates the logical condition present when the labeled lead is positive with respect to ground. Absence of the labeled condition causes a ground potential to appear on the labeled lead.

The flip flop F1 is arranged to be set when a logic 1 signal appears at the output terminal of a conventional OR gate 190. The gate 190 produces a logic 1 output signal, and applies it to the set input terminal S of the flip flop F1, in response to either a START pulse, produced at times by a conventional one-shot multivibrator 191 in a manner to be described, or to a logic 1 signal appearing at the output terminal of a conventional AND gate 192.

The multivibrator 191 produces a positive pulse at the trailing edge of a CLEAR pulse produced at times by a conventional one-shot multivibrator 193. The CLEAR pulse is produced by the one-shot multivibrator 193 at the rising transition produced when the front housing 18 in FIG. 3 is closed and the cassette 3 is in the receptacle 69 to cause the switch S1 to be closed.

Referring again to FIG. 9, the switch S1 may be provided with two armatures *a* and *b*. The armature *a* is connected to ground, and when the switch S1 is closed, a falling transition is produced that triggers the one-shot multivibrator 193. At the same time, or slightly ahead of that time, the armature *b* of the switch S1 is closed to apply the battery potential CB+, from the battery 116 in the cassette 3 as shown in FIG. 1, to other circuits of the camera, as a supply potential labeled B+.

The CLEAR pulse is applied to one input terminal of a two input terminal OR gate 194. The gate 194 has an active output terminal connected to the reset input terminal R of the flip flop F1. Accordingly, the flip flop F1 is reset when the CLEAR pulse is produced, and, after the CLEAR pulse, is set by the START pulse produced by the multivibrator 191 is supplied through the gate 190.

A second input terminal of the OR gate 194 receives a signal END, produced as a positive pulse by a conventional one-shot multivibrator 195 when the switch S4 is momentarily closed by the cam 121 on the belt 107 as the cam moves toward the end of an operating cycle in a manner to be described. When the END pulse is produced, the flip flop F1 is reset to remove the RUN signal, and thereby stop the motor 82.

A first input terminal of the AND gate 192 receives a pulse labeled SCP, produced as a positive pulse by a conventional one-shot multivibrator 196 at a transition to ground produced by the switch S5 when the shutter is closed, as described above in connection with FIGS. 4 and 5. The second input signal applied to the AND gate 192 is a positive level labeled MUS. The signal MUS is produced at the output terminal of a conventional NOR gate 197 when the switch S3 is closed as the mirror 67 is released and moves to its upper, or film exposing, position. As the switch S3 is closed by the mirror 67, a stop 198, which may be assumed to be secured to the top panel 9 in FIG. 1, is engaged and holds the mirror against the force of the spring 83, shown schematically in FIG. 9.

The falling transition produced by the switch S3 when first closed triggers a conventional one-shot multivibrator 199 to produce an output pulse that has a duration sufficient to persist beyond the time when the mirror 67 may be vibrating or bouncing at the end of its travel to the stop 198. At the trailing edge of the pulse produced by the one-shot multivibrator 199, a conventional one-shot multivibrator 200 is triggered to produce a positive pulse labeled EMD.

At the leading edge of the pulse EMD, a conventional one-shot multivibrator 201 is triggered to produce a timed pulse labeled OT. The duration of the pulse OT is selected to be sufficient to allow operation of the solenoid SK2, to move the interceptor 155 in FIGS. 4, 5 and 7 into position to intercept the walking beam 158 and hold it in that position, until the blades 47 and 48 have had time to move in the FIG. 4 position in which the lens is open to its maximum aperture. That operation will be described in somewhat more detail below.

Figure 10:
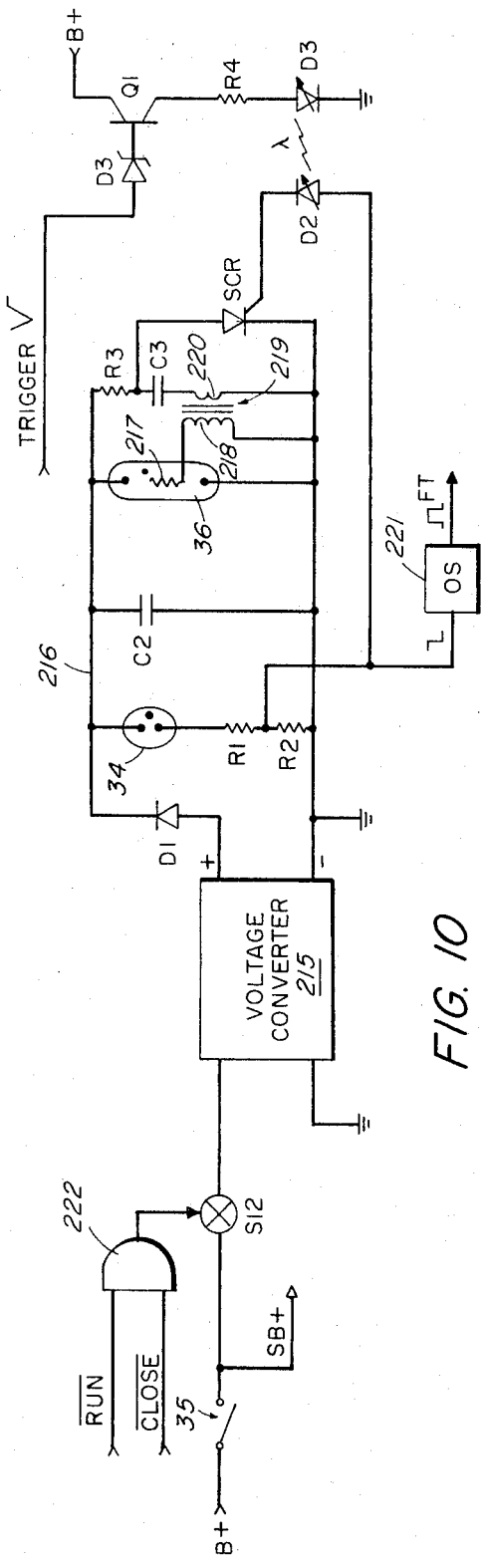
FIG. 10 is a schematic block and wiring diagram of an electronic flash system forming a part of the camera of FIG. 1.

When the pulse OT is produced, a conventional electronic switch S11 is closed to supply operating potential, labeled SB+, that is present at the potential B+, when the switch 35 is closed, as shown in FIG. 10, through the winding of the solenoid SK2 to ground.

When the switch S11 is opened after it has been closed, so that the solenoid SK2 is deenergized, a rapid negative voltage spike is produced across the winding of the solenoid SK2, labeled TRIGGER. The TRIG- GER signal is used to trigger the strobe unit, in a manner to be described below.

As described above, the shutter blades 47 and 48 are normally in the open position, and held there under the influence of the spring 167. The solenoid SK1 is energized to close the shutter when a conventional electronic switch S8 is closed by a positive level labeled CLOSE produced when a flip flop F2 is set in a manner to be described. When the flip flop F2 is set, the signal CLOSE closes the switch S8 to admit current from the supply terminal at B+ through the winding of the solenoid SK1 to ground.

The flip flop F2 is arranged to be set when a logic 1 signal is produced at the active output terminal of a conventional OR gate 202. The gate 202 produces a logic 1 output signal to set the flip flop F2 in response to either a pulse from a conventional one-shot multivibrator 203, to a pulse produced by another conventional one-shot multivibrator 204, or to a signal labeled FT produced at times by the strobe and flash sequencing circuit, to be described below.

The one-shot multivibrator 203 is triggered by the transition toward ground produced when a pushbutton SPB is momentarily depressed. The pushbutton SPB has an actuating button comprising the shutter button 49 described above.

The multivibrator 204 produces an output pulse labeled EE in response to the rising transition produced when a conventional Schmitt trigger circuit 205 receives an input voltage above a predetermined value. The Schmitt trigger 205 is controlled by a photocell that is arranged to sense the light passing through the aperture 173 described above in connection with FIGS. 4 and 5.

Figure 9:
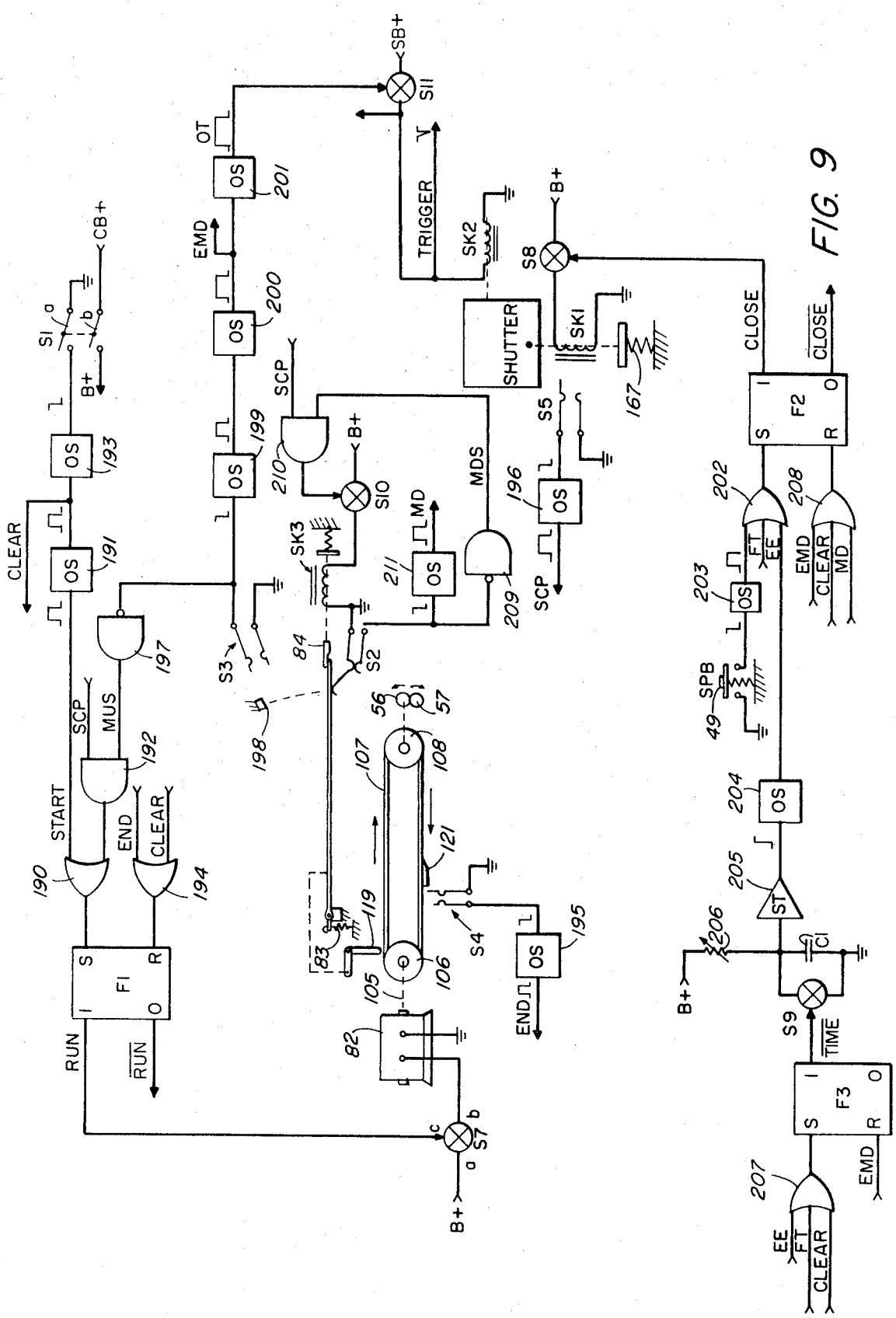
FIG. 9 is a schematic block and wiring diagram of a control system forming a part of the camera of FIG. 1.

Turning to FIG. 9, the photocell comprises a photo-conductive element 206 that has a high impedance when not illuminated, and a progressively lower impedance when progressively more illuminated. The photoconductor 206 is connected between the supply terminal at B+ and the active input terminal of the Schmitt trigger circuit 205.

The active input terminal of the Schmitt trigger 205 is connected to ground through a storage capacitor C1. A conventional electronic switch S9 has load terminals connected in parallel with the capacitor C1, to shunt the capacitor C1 when the switch S9 is closed.

The switch S9 is closed when logic 1 signal labeled $\overline{\text{TIME}}$ is applied to its control terminal. The signal $\overline{\text{TIME}}$ is present at logic 1 when a flip flop F3 is set.

The flip flop F3 is set when an OR gate 207 produces a logic 1 output signal and applies it to the set terminal S of the flip flop F3. The gate 207 has three input terminals, each receiving a different one of the signals labeled EE, FT and CLEAR. Accordingly, the flip flop F3 is set at any time that any of these signals is present at logic 1. The flip flop F3 is reset by the signal EMD corresponding to the output pulse produced by the oneshot multivibrator 200.

The flip flop F2 is arranged to be reset by an OR gate 208 in response to any of the signals EMD, CLEAR or MD. The manner in which the EMD and CLEAR pulses are produced has been described above. The signal MD is produced as a positive pulse by a conventional one-shot multivibrator 211 in respose to the ground going transition produced when the switch S2 is closed as the mirror 67 is moved down into the latched position.

When the mirror 67 is moved down and the switch S2 is closed, a conventional NOR gate 209 produces a logic 1 signal labeled MDS that is applied to one input terminal of a conventional AND gate 210. The second terminal of the gate 210 receives the "shutter closed" pulse SCP produced by the multivibrator 196 as discussed above.

When the pulse SCP is produced and the signal MDS is present, the gate 210 produces a logic 1 output signal that closes a conventional electronic switch S10 to energize the solenoid SK3. The solenoid SK3 then retracts the latch 84 and allows the mirror 67 to spring up under the influence of the spring 83 into the picturetaking position described above.

Ths strobe control circuits used in conjunction with the control circuits of FIG. 9 will next be described with reference to FIG. 10.

Referring to FIG. 10, the strobe circuit comprises a voltage converter 215 of any conventional design, which serves to transform the relatively low voltage B+, such as six volts, to a high pulsating voltage at, for example, three hundred and fifty volts. The process essentially involves converting the DC voltage to AC, producing the high voltage and with the aid of a transformer, and rectifying the high voltage AC to produce a DC voltage of a desired potential.

As shown, the DC potential B+ is supplied to the voltage converter 215 over the ON-OFF switch 35, in its closed position, and over the load terminals of a conventional electronic switch S12 that is closed when an AND gate 222 produces a logic 1 output signal. The gate 222 receives the levels $\overline{\text{RUN}}$ and $\overline{\text{CLOSE}}$, and thus produces a logic 1 output signal when the motor is not running and the shutter is open. Referring to FIGS. 9 and 10, the signal $\overline{\text{RUN}}$ is produced at the logic 0 output terminal of the flip flop F1 when that flip flop is reset, and the signal $\overline{\text{CLOSE}}$ is produced at the logic 0 output terminal of the flip flop F2 when that flip flop is reset.

When the switches 35 and S12 are closed, the voltage converter 215 charges a capacitor C2 through a diode D1. The diode D1 prevents the flow of current in a reverse direction at times when the voltage converter 215 is below the potential of the capacitor C2.

The ready light 34 may be any conventional gas discharge tube. As shown, it is connected between the lead 216, on which a positive voltage for charging the capacitor C2 appears, and ground, through a pair of current limiting resistors R1 and R2 in series. The total resistance of the resistors R1 and R2 is selected to limit the current flowing through the ready light 34 to a suitable low value. The ratio of the resistors R1 and R2 is selected to provide a voltage across the resistor R2, when the ready light 34 is glowing, sufficient to supply gate current to the gate terminal of a conventional silicon controlled rectifier SCR through a light-responsive diode D2. The diode D2 may be any conventional device of the type which conducts in the forward direction when exposed to light. Alternatively, a photoconductive transistor or the like could be employed.

The light-emitting gas discharge tube 236 has anodes connected between the lead 216 and ground, and a grid 217 connected to one terminal of the high voltage secondary winding 218 of a pulse transformer generally designated 219. The other terminal of the winding 218 is connected to ground.

The low voltage primary winding 220 of the pulse transformer 219 has one terminal connected to ground, and a second terminal returned to the lead 216 through a capacitor C3 in series with a resistor R3. The controlled rectifier SCR has its anode connected to the junction of the resistor R3 and the capacitor C3. The cathode of the controlled rectifier SCR is connected to ground.

The negative going TRIGGER signal, produced as described above in connection with FIG. 9, is applied to the anode of a zener diode D3. The cathode of the diode D3 is connected to the base of a conventional PNP transistor Q1. The emitter of the transistor Q1 is connected to the supply terminal at the potential B+. The collector of the transistor Q1 is returned to ground through a resistor R4 in series with a conventional light-emitting diode D3.

In response to the TRIGGER pulse, the zener diode D3 breaks down to bias the transistor Q1 into conduction and causes current flow through the resistor R4 and the light-emitting diode D3, producing a flash of light which illuminates the diode D2 to admit gate current to the controlled rectifier SCR and gate it into conduction. It will be apparent that that can only occur if the capacitor C2 is charged to a sufficient voltage to cause the ready light 34 to conduct, thereby producing a driving voltage across the resistor R2.

When the controlled rectifier SCR is gated into conduction, the capacitor C3 is abruptly discharged through the primary winding 220 of the pulse transformer 219, producing a high voltage ringing pulse, of five thousand volts, for example, which is applied to the grid 217 of the tube 36 to cause it to ionize and discharge, producing a flash of light by discharge of the capacitor C2.

The junction of the resistors R1 and R2 is connected to the active input terminal of a conventional one-shot multivibrator 221 which is triggered by the falling potential produced across the resistor R2 when the ready light 34 goes out upon discharge of the capacitor C2. The pulse produced by the multivibrator 221 under these conditions comprises the signal FT described above in connection with FIG. 9.

Having thus described the construction of the illustrated embodiment of the invention, its operation will next be described with reference to FIGS. 1 through 10. First, referring to FIGS. 1 and 2, assume that the housing 18 is open, as shown in FIG. 2, and that a cassette 3 is next inserted into the position shown in FIG. 1.

When the housing 18 is closed, the switch S1 in FIGS. 3 and 9 will be closed. Referring to FIG. 9, that will cause the potential B+ to be produced, and trigger the multivibrator 193 to produce the CLEAR pulse.

The CLEAR pulse will reset the flip flops F1 and F2, and set the flip flop F3, through the OR gates 194, 208 and 207, repsectively. Assuming that the camera is in the erected position shown in FIG. 1, with the mirror 67 down as shown, the switch S2 will be closed as shown in FIG. 9.

Figure 11:
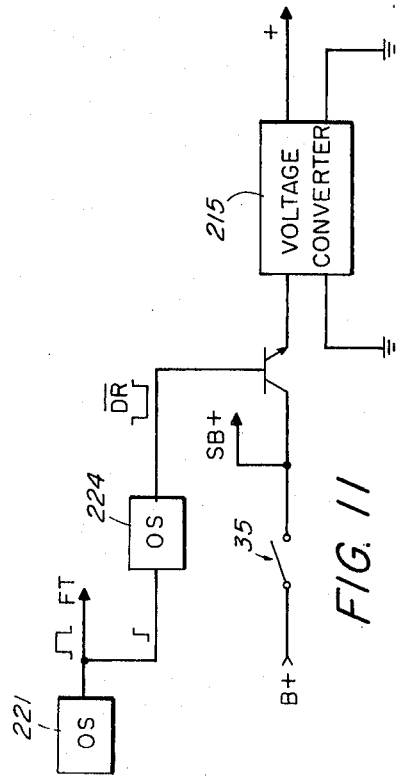
FIG. 11 is a schematic block and wiring diagram of a modification of the apparatus of FIG. 10.

With the flip flops F1 and F2 reset, the levels $\overline{\text{RUN}}$ and $\overline{\text{CLOSE}}$ will be applied to the AND gate 222 to close the switch S12 in FIG. 11. Assuming that the switch 35 is closed, the voltage converter 215 will begin to charge the capacitors C2 and C3.

Meanwhile, referring to FIG. 9, the trailing edge of the CLEAR pulse will trigger the multivibrator 191 to produce the START pulse that sets the flip flop F1 through the OR gate 190. That will cause the signal RUN to be produced, closing the switch S7 and causing the motor 82 to begin to run to drive the timing belt 107. At the same time, removal of the level $\overline{\text{RUN}}$ will open the switch S12 in FIG. 10. That will interrupt the charging of the strobe unit, in this instance before the capacitor C2 will have accumulated any appreciable charge.

Referring to FIGS. 1 and 2, with the mirror 67 down, the follower 120 will be out of the way, and the cam 121 will pass it without engagement. The switch S3 will be open.

The cam 121 will next encounter the arm 122 that is connected to the picker finger 98 as shown in FIG. 3. The picker finger will then engage the corner of the dark slide 99 that covers the first film unit 72, and move the dark slide out into engagement with the processing rolls 56 and 57, which are rotating at this time. The dark slide will next be driven against the plate 53 and down and out through the exit slot 65.

The motor will continue to operate until the cam 121 reaches the position which it momentarily closes the switch S4, shown in FIGS. 2 and 9, to trigger the one-shot multivibrator 195 to produce the pulse labeled END. The END pulse now resets the flip flop F1 through the OR gate 194, causing the level RUN to disappear and open the switch S7 to stop the motor 82. The parts will coast to a stop with the cam 121 somewhere in the vicinity shown in FIG. 2.

With the flip flop F1 reset, the level $\overline{\text{RUN}}$ will close the switch S12 in FIG. 10. The capacitors C2 and C3 will now charge to a level sufficient to cause the ready light 34 to discharge and glow.

The apparatus is now in condition for making a flash exposure. Referring to FIG. 10, it will be assumed that the capacitor C2 is fully charged, and that the ready light 34 is glowing to indicate the readiness of the strobe unit to be fired. Next, assume that the shutter pushbutton 49 is depressed to close the switch SPB in FIG. 9, triggering the one-shot multivibrator 203. The pulse produced by the multivibrator 203 will set the flip flop F2 through the OR gate 202. The signal CLOSE will be produced, closing the switch S8 and supplying current to the shutter operating solenoid SK1. At the same time, removal of the level $\overline{\text{CLOSE}}$ will disable the AND gate 222 and open the switch S2, temporarily interrupting the flow of current to the voltage converter 215. However, this interruption will not be of sufficient duration to allow discharge of the capacitor C2 below the firing potential of the ready lamp 34.

Referring to FIGS. 4 and 5, energizing the solenoid SK1 will cause the shutter blades 47 and 48 to be moved from the position shown in FIG. 4 to the position shown in FIG. 5, covering the opening in the lens 46. The photocell aperture 173 will also be closed at this time.

Referring to FIG. 9, with the flip flop F3 set, the level TIME will be produced to close the switch S9, shunting the capacitor C1. When the shutter is closed, the switch S5 will be closed to trigger the one-shot multivibrator 196 to produce the pulse SCP. The pulse SCP, applied to the gate 210, will cause the switch S10 to be closed. The gate 210 is enabled at this time by the presence of the signal MDS produced by the NOR gate 209.

With the siwtch S10 closed, the solenoid SK3 will be energized, the mirror latch 84 will be released, and the mirror 67 will fly up under the influence of the spring 83. When the mirror reaches its upper position, the switch S3 will be closed. That will cause the multivibrator 199 to be triggered, to produce its output pulse, and will cause the gate 197 to produce the level MUS. Since the pulse SCP has disappeared by this time, the gate 192 will not produce a logic 1 output signal.

At the end of the pulse produced by the multivibrator 199, the multivibrator 200 will be triggered to produce the pulse EMD. The leading edge of this pulse will produce the timed pulse OT by triggering the multivibrator 201. That will cause the switch S11 to be closed, energizing the solenoid SK2. Referring to FIG. 7, that will cause the interceptor pin 155 to be raised into the path of the walking beam 158, shown also in FIG. 5.

The pulse EMD will reset the flip flop F2 through the gate 208, causing the signal $\overline{CLOSE}$ to be produced and the level CLOSE to be removed. Removing the level CLOSE will open the switch S8, deenergizing the solenoid SK1 and allowing the shutter blades to move towards their open position. The level $\overline{CLOSE}$ will cause the switch S12 to close, resuming charging of the strobe unit.

The pulse EMD will also reset the flip flop F3 to remove the level $\overline{TIME}$ and open the switch S9. The capacitor C1 will accordingly begin to charge through the photocell 206.

Referring to FIG. 8, at some position determined by the focused position of the lens, the walking beam 158 will strike the interceptor pin 155 and stop the blades at a predetermined maximum aperture determined by the distance at which the lens is focused. This interception will occur at some time during the interval established by the pulse OT from the multivibrator 201 in FIG. 9, as the latter is long enough to allow the blades to reach full aperture if that is required.

At the end of the pulse OT, the switch S11 will be opened and the solenoid SK2 will be released. Referring to FIG. 7, even though the solenoid SK2 is deenergized, the interceptor pin 155 will remain in the dotted-line position shown under the force of the walking beam 158.

Referring to FIG. 10, when the solenoid SK2 is deenergized, the negative TRIGGER spike will be produced to briefly gate the transistor Q1 into conduction and thereby causing the light-emitting diode D3 to emit a light flash that will excite the diode D2 into conduction. That will gate the controlled rectifier SCR into conduction, abruptly discharging the capacitor C3 and triggering the tube 36 to allow the capacitor C2 to discharge through it and produce a flash of light.

Upon discharge of the capacitor C2 through the gas tube 36, the ready light 35 will cease to conduct, producing a falling voltage transition across the resistor R2. This falling transition will trigger the multivibrator 221 to produce the pulse FT.

If the switch 35 is open, of if the strobe unit is not fully charged, so that the signal FT is not produced, or if the level of ambient light is high enough, the exposure will be terminated by charging of the capacitor C1 to the voltage at which the Schmitt trigger 205 will respond to trigger the one-shot multivibrator 204, producing the pulse EE. The pulse EE will set the flip flop F2 to produce the CLOSE signal, closing the shutter to terminate the exposure. With the switch 35 in its closed position, however, the shutter will normally be closed in response to the signal FT, in the manner next to be described.

Referring to FIG. 9, the pulse FT will set the flip flop F3 through the gate 207 to produce the $\overline{TIME}$ signal that will close the switch S9 and discharge the capacitor C1. At the same time, the pulse FT will set the flip flop F2 through the OR gate 202 to produce the signal labeled CLOSE, and remove the level $\overline{CLOSE}$. That will cause the switch S12 in FIG. 10 to open, interrupting the charging of the strobe unit.

The CLOSE signal will close the switch S8 to cause the solenoid SK1 to be energized and close the shutter. When the shutter is closed, the switch S5 in FIG. 9 will be closed to trigger the multivibrator 196 to produce the pulse SCP.

In the presence of the level MUS from the gate 197, produced with the "mirror up" switch S3 closed, the pulse SCP will cause the AND gate 192 to produce a logic 1 output pulse that will set the flip flop F1 through the OR gate 190. The level RUN will now be produced to close the switch S7 and cause the motor 82 to run.

The cam 121 on the timing belt 107 will now engage the end 120 of the arm 119, as shown in FIG. 2 and more schematically in FIG. 9, and the mirror 67 will be driven down against the force of the spring 83. As the mirror moves down into its lower position, it will move back the latch 84 and become latched, closing the switch S2.

When the switch S2 closes, the multivibrator 208 will be triggered to produce the pulse MD. This pulse will reset the flip flop F2 through the gate 208. The switch S8 will then be opened to deenergize the solenoid SK1 and allow the shutter to open.

The cam 121 will move free of the arm 120, and over into engagement with the picker finger operating arm 122, causing the uppermost film unit 72 just exposed in the manner described above to be advanced to the processing rolls 56 and 57, which are rotating at this time. The film unit will be driven through the processing rolls and out through the exit slot 65, for delivery to the photographer.

The belt 107 will continue to be driven until the cam 121 again momentarily closes the switch S4, causing the signal END to be produced by the multivibrator 195 in FIG. 9. The END signal will reset the flip flop F1 through the OR gate 194, causing the motor 82 to stop.

With the flip flops F1 and F2 both reset, the levels $\overline{CLOSE}$ and $\overline{RUN}$ will close the switch S12 through the gate 222. The apparatus will now be in a standby condition, with the voltage converter 215 in FIG. 10 operating to charge the capacitors C2 and C3 until the ready light 34 again glows to indicate that the apparatus is ready for another exposure. Operation of the camera to take a series of pictures may continue in the manner just described above for a typical illustrative exposure. When the last film unit has been exposed and ejected, the camera housing 18 can be opened to allow the removal of the cassette body, in readiness for replacement by a new cassette.

FIG. 11 illustrates a modified recycle control system for the strobe unit of FIG. 10. Except as illustrated in FIG. 11, the system can otherwise be identical with that shown and described in connection with FIGS. 1 through 10.

As shown in FIG. 11, the signal FT, produced by the multivibrator 221, may be applied to a conventional one-shot multivibrator 224. The leading edge of the pulse FT triggers the multivibrator 224 to produce a ground level pulse DR of sufficient duration to allow the motor 82 in FIG. 9 to complete its cycle of operation to advance a film unit out through the rolls 56 and 57, and activate the switch S4 to cause the flip flop F1 to be reset.

The normally positive active output terminal of the multivibrator 224 is connected to the base of an NPN power transistor Q1. The emitter of the transistor Q1 is connected to the upper input terminal of the voltage converter 215. The collector of the transistor Q1 is connected to the supply terminal at B+ over the manually operable switch 35.

The transistor Q1 thus acts as a normally closed electronic switch supplying energizing current to the voltage converter 215 to cause charging of the capacitors C2 and C3 in FIG. 9. When the ground level pulse DR is produced, the transistor Q1 is cut off, and interrupts the recharging of the electronic flash unit during the interval of motor operation. It will be apparent that the effect of this modification, which consists in replacing the gate 222 and the switch S12 in FIG. 10 with the multivibrator 224 and the transistor Q1, is to allow recharging of the flash unit during the initial energization of the solenoid SK1 before the flash unit is triggered. Since this interval is very brief, it contributes little to power consumption, and ignoring it serves to suppress switching transients. A similar effect may be produced by eliminating the gate 222 in FIG. 9 and applying the level $\overline{RUN}$ directly to the control terminal of the switch S12.

While the invention has been described with respect to the details of a particular embodiment, many changes and variations will occur to those skilled in the art upon reading this description. Such can obviously be made without departing from the scope of the invention.

Having thus described the invention, what is claimed is:

1. In combination with a camera having an electric film transport motor; an electronic flash unit, said flash unit comprising a storage capacitor, means responsive to an applied voltage for charging said capacitor, a gas discharge tube, and circuit means responsive to an applied trigger signal for discharging said capacitor through said discharge tube to produce an illuminating flash of light; a pair of terminals adapted to be connected to a source of voltage; first switching means operable to first and second states, circuit means closed by said first switching means in its first state for connecting said terminals to said film transport motor to operate said motor when said terminals are connected to a source; second switching means operable to first and second states, circuit means closed by said second switching means in its first state for connecting said terminals to said capacitor charging means, means effective when said first switching means is in its second state for setting said second switching means to its first state, and means responsive to the discharge of said capacitor through said tube for setting said second switching means to its second state.

2. Photographic apparatus, comprising a camera, an electronic flash unit mounted on said camera, said camera comprising a housing, means forming an exposure station in said housing, film transport means mounted in said housing and operable in response to an applied voltage to advance a film unit at said exposure station over a predetermined film transport increment, a manually operable pushbutton on said housing, a pair of terminals in said housing adapted to be connected to a source of voltage, said electronic flash unit comprising rechargeable electronic flash means triggerable when charged to produce a light-emitting discharge, charging circuit means comprising a normally closed switch connecting said terminals to said electronic flash means when said switch is closed and effective when a source of voltage is connected to said terminals to charge said electronic flash means, sequencing means responsive to the operation of said pushbutton for executing an exposure sequence, means controlled by said sequencing means for triggering said electronic flash means, means responsive to the discharge of said flash means for opening said switch, means responsive to the discharge of said flash means for connecting said film transport means to said terminals and effective when a film unit is at said exposure station and source of voltage is connected to said terminals for operating said film transport means to advance the film unit, over said advance increment means responsive to the extent of operation of said film transport means for disconnecting said film transport means from said terminals after operation of said film transport means sufficient to advance a film unit over said advance increment, and means actuated when said film transport means is disconnected from said terminals for closing said switch.

3. A control system for a camera having a film transport motor, a shutter, a rechargeable electronic flash means triggerable when charged to produce a light-emitting discharge, and a manually operable shutter button, said system comprising means responsive to the operation of said shutter button for opening said shutter, means actuated when said shutter is open for triggering said flash unit, means responsive to the discharge of said flash means for closing said shutter, means responsive to the closing of said shutter for operating said film transport motor, circuit means comprising a switch and means effective when said switch is closed for recharging said flash means, and means responsive to the discharge of said flash means for opening said switch while said motor is operating.

4. A control system for a camera having an electric film transport motor, a shutter, rechargeable electronic flash means triggerable when charged to produce a light-emitting discharge, a manually operable shutter button, and a pair of terminals adapted to be connected to a source of voltage, said system comprising means effective when a source of voltage is connected to said terminals and responsive to the operation of said shutter button to open said shutter, means actuated when said shutter is open for triggering said electronic flash means, means responsive to the discharge of said flash means for closing said shutter, means actuated when said shutter is closed after said flash unit is discharged for connecting said terminals to said electric motor to supply operating current to said motor when a source of voltage is connected to said terminals, film transport means driven by said motor over a predetermined cycle, means operated by said film transport means at the end of said cycle for disconnecting said terminals from said motor means, means comprising a normally closed switch and effective when a source of voltage is connected to said terminals and said switch is closed for connecting said terminals to said electronic flash means to supply recharging current to said flash means, and means responsive to the discharge of said flash means for opening said switch at least while said motor is receiving current from said terminals.

5. A control system for a camera having a rechargeable electronic flash means triggerable when charged to produce a light-emitting discharge, a film transport motor, and terminals adapted to be connected to a battery, said system comprising a first normally closed switch for connecting said terminals to said electronic flash means to supply recharging current to said flash means when a battery is connected to said terminals and said first switch is closed, a second normally open switch for connecting said terminals to said film transport motor to supply operating current to said motor when a battery is connected to said terminals and said second switch is closed, sequencing means operable to sequentially trigger said electronic flash means, close said switch, and then open said second switch, and means responsive to the discharge of said electronic flash means for opening said first switch at least while said second switch is closed.

6. In a power distribution system for an automatic camera having a film transport motor, rechargeable electronic flash means, and sequencing means for sequentially triggering said flash means to produce a flash of light and then operating said motor over a film transport cycle, said system comprising a pair of terminals adapted to be connected to a battery, means controlled by said sequencing means for connecting said terminals to said motor during said film transport cycle, circuit means comprising a normally closed switch for connecting said terminals to said flash means to supply recharging current to said flash means, and means for opening said switch at least during said film transport cycle.

7. The apparatus of claim 6 in which said means for opening said switch comprises timing means operated when said flash means is triggered for producing a timing signal having a duration greater than the duration of said film transport cycle, and switch control means responsive to said timing signal for opening said switch while said signal is present.

8. The apparatus of claim 6 in which said means for opening said switch comprises a register settable to first and second states, means controlled by said sequencing means for setting said register to its first state at the beginning of a film transport cycle, means controlled by said sequencing means for setting said register to its second state at the end of a film transport cycle, and switch control means actuated by said register for opening said switch when said register is in its first state.

9. Photographic apparatus, comprising, in combination, a camera comprising a housing, means forming an exposure station in said housing, film transport means mounted in said housing and operable in response to an applied voltage to advance a film unit at said exposure station over a predetermined film advance increment, manually operable means on said housing for producing an exposure initiating signal when operated, a pair of terminals in said housing adapted to be connected to a source of voltage, rechargeable electronic flash means triggerable when charged to produce a light-emitting discharge, charging circuit means comprising a normally closed switch connecting said terminals to said electronic flash means when a source of voltage is connected to said terminals to charge said electronic flash means, sequencing means responsive to said exposure initiating signal for executing an exposure sequence, means controlled by said sequencing means for triggering said electronic flash means, means responsive to the discharge of said flash means for producing a timing signal of predetermined duration sufficient to permit the operation of said film transport means to advance a film unit over said advance increment, means responsive to said timing signal for opening said switch during said predetermined interval, means responsive to the discharge of said flash means for connecting said film transport means to said terminals and effective when a film unit is in said exposure station and a source of voltage is connected to said terminals for operating said film transport means to advance the film unit, and means responsive to the extent of operation of said film transport means for disconnecting said film transport means from said terminals after operation of said film transport means sufficient to advance a film unit over said increment.

10. A control system for a camera having a film transport motor, a shutter, means for mounting a rechargeable electronic flash means triggerable when charged to produce a light-emitting discharge, and a manually operable shutter button, said system comprising means responsive to the operation of said shutter button for opening said shutter, means actuated when said shutter is open to produce a trigger signal for triggering the flash unit, means responsive to the discharge of the flash means for closing said shutter, means responsive to the closing of said shutter for operating said film transport motor, circuit means comprising a switch and means effective when said switch is closed to produce a current for recharging the flash means, and means for opening said switch while said motor is operating.

11. A control system for a camera having a film transport motor, a shutter, means for mounting a rechargeable electronic flash means triggerable when charged to produce a light-emitting discharge, and a manually operable shutter button, said system comprising means responsive to the operation of said shutter button for opening said shutter, means actuated when said shutter is open to produce a signal for triggering the flash unit, means for closing said shutter, means for operating said film transport motor, circuit means comprising a switch and means effective when said switch is closed to produce a current for recharging said flash means, and means for opening said switch while said motor is operating.

12. A control system for a camera having an electric film transport motor, a shutter, rechargeable electronic flash means triggerable when charged to produce a light-emitting discharge, a manually operable shutter button, and a pair of terminals adapted to be connected to a source of voltage, said system comprising sequencing means effective when a source of voltage is connected to said terminals and responsive to the operation of said shutter button to open said shutter, to produce a signal for triggering said electronic flash means, and then close said shutter, means actuated when said shutter is closed after said flash unit is discharged for connecting said terminals to said electric motor to supply operating current to said motor when a source of voltage is connected to said terminals, film transport means driven by said motor over a predetermined cycle, means operated by said film transport means at the end of said cycle for disconnecting said terminals from said motor means, means comprising a normally closed switch and effective when a source of voltage is connected to said terminals and said switch is closed for connecting said terminals to said electronic flash means to supply recharging current to said flash means, and means for opening said switch at least while said motor is receiving current from said terminals.

13. A control system for a camera having first and second terminals adapted to be connected to the supply terminals of a rechargeable electronic flash means triggerable when charged to produce a light-emitting discharge, and at least a third terminal adapted to supply a trigger signal for triggering the flash means, a film transport motor, and input terminals adapted to be connected to a battery, said system comprising a first normally closed switch for connecting said input terminals to said first and second terminals to supply recharging current to the flash means when a battery is connected to said input terminals and said first switch is closed, a second normally open switch for connecting said input terminals to said film transport motor to supply operating current to said motor when a battery is connected to said input terminals and said second switch is closed, sequencing means operable to sequentially supply a trigger signal to said third terminal, close said second switch, an then open said second switch, and means for opening said first switch at least while said second switch is closed.

* * * * *